(12) United States Patent
Kela et al.

(10) Patent No.: US 10,873,978 B2
(45) Date of Patent: Dec. 22, 2020

(54) BEAM BASED RANDOM ACCESS

(71) Applicant: HUAWEI TECHNOLOGIES CO., LTD., Guangdong (CN)

(72) Inventors: Petteri Kela, Helsinki (FI); Mario Costa, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/381,743

(22) Filed: Apr. 11, 2019

(65) Prior Publication Data

US 2019/0261432 A1    Aug. 22, 2019

Related U.S. Application Data

(63) Continuation of application No. PCT/EP2016/074509, filed on Oct. 12, 2016.

(51) Int. Cl.
*H04W 74/08* (2009.01)
*H04W 40/24* (2009.01)
(Continued)

(52) U.S. Cl.
CPC ...... *H04W 74/0841* (2013.01); *H04B 7/0408* (2013.01); *H04L 5/0026* (2013.01);
(Continued)

(58) Field of Classification Search
CPC .. H04B 7/0408; H04B 7/0617; H04B 7/0413; H04W 74/0833; H04W 76/11;
(Continued)

(56) References Cited

U.S. PATENT DOCUMENTS

2010/0074204 A1    3/2010  Meylan
2016/0094975 A1*   3/2016  Sheng ............... H04W 8/005
                                                  370/216
(Continued)

FOREIGN PATENT DOCUMENTS

CN   103747534 A   4/2014
CN   104219774 A   12/2014
(Continued)

OTHER PUBLICATIONS

Jin, Huiqin et al., "Improved channel estimation method based on uncorrelated implicit training sequence", Ship electronice engineering, vol. 36, No. 4, Apr. 2016, 5 pages.
(Continued)

*Primary Examiner* — Brian D Nguyen
(74) *Attorney, Agent, or Firm* — Slater Matsil, LLP

(57) ABSTRACT

A network node for a wireless communication system includes a processor and a transceiver. The processor is configured to generate a plurality of random access grant signals. The random access grant signals include at least one unoccupied radio network temporary identifier and a resource allocation for an uplink communication request. The plurality of random access grant signals are assigned to one or more downlink transmit beams and the transceiver is configured to periodically transmit the plurality of random access grant signals on the one or more downlink transmit beams using a same time-frequency resource.

20 Claims, 11 Drawing Sheets

(51) Int. Cl.
*H04W 68/00* (2009.01)
*H04W 72/04* (2009.01)
*H04W 72/14* (2009.01)
*H04W 76/11* (2018.01)
*H04W 76/27* (2018.01)
*H04B 7/0408* (2017.01)
*H04L 5/00* (2006.01)
*H04B 7/0413* (2017.01)
*H04B 7/06* (2006.01)

(52) U.S. Cl.
CPC ......... *H04L 5/0053* (2013.01); *H04W 40/244* (2013.01); *H04W 68/005* (2013.01); *H04W 72/046* (2013.01); *H04W 72/14* (2013.01); *H04W 74/0833* (2013.01); *H04W 76/11* (2018.02); *H04W 76/27* (2018.02); *H04B 7/0413* (2013.01); *H04B 7/0617* (2013.01)

(58) Field of Classification Search
CPC ... H04W 40/244; H04W 76/27; H04W 72/14; H04W 74/0841; H04W 72/046; H04W 68/005; H04L 5/0053; H04L 5/0026
See application file for complete search history.

(56) References Cited

U.S. PATENT DOCUMENTS

| | | | | |
|---|---|---|---|---|
| 2016/0100380 | A1* | 4/2016 | Jha | H04W 68/005 455/458 |
| 2016/0157267 | A1* | 6/2016 | Frenne | H04B 7/0617 370/329 |
| 2016/0165636 | A1* | 6/2016 | Lindstrom | H04W 48/08 370/329 |
| 2016/0227582 | A1* | 8/2016 | Vajapeyam | H04W 74/0833 |
| 2016/0309519 | A1 | 10/2016 | Quan et al. | |
| 2016/0323915 | A1* | 11/2016 | Liu | H04W 74/0833 |
| 2017/0034693 | A1* | 2/2017 | Ono | H04W 8/26 |
| 2017/0201974 | A1* | 7/2017 | Sohn | H04W 74/008 |
| 2018/0198201 | A9* | 7/2018 | Irvine | H01Q 3/28 |
| 2018/0235013 | A1* | 8/2018 | Jung | H04W 74/006 |
| 2018/0242300 | A1* | 8/2018 | Hakola | H04W 72/046 |
| 2019/0053286 | A1* | 2/2019 | Cho | H04B 7/0695 |
| 2019/0098667 | A1* | 3/2019 | Lai | H04W 74/0833 |

FOREIGN PATENT DOCUMENTS

| | | |
|---|---|---|
| CN | 10509981 A | 11/2015 |
| TW | 201019771 A | 5/2010 |
| WO | 2009113815 A2 | 9/2009 |

OTHER PUBLICATIONS

Samsung, "Random Access Procedure in NR",3GPP TSG-RAN WG2 95bis R2-166065,Kaohsiung, Taiwan, Oct. 10-14, 2016,total 8 pages.

Emil Bjornson et al., "Random Access Protocol for Massive MIMO:Strongest-User Collision Resolution (SUCR)", arXiv:1512. 00490v2,Mar. 11, 2016,total 6 pages.

International Search Report issued Jun. 7, 2017 in corresponding International Application No. PCT/EP2016/074509.

Written Opinion of the International Searching Authority dated Jun. 7, 2017 in corresponding International Application No. PCT/EP2016/074509.

* cited by examiner

BEAM BASED RANDOM ACCESS

CROSS-REFERENCE TO RELATED APPLICATIONS

This application is a continuation of International Application No. PCT/EP2016/074509, filed on Oct. 12, 2016, the disclosure of which is hereby incorporated by reference in its entirety.

TECHNICAL FIELD

The aspects of the present disclosure relate generally to wireless communication systems and more particularly to random access procedures in wireless communication systems.

BACKGROUND

Random access procedures are used in legacy cellular systems for connecting a user equipment (UE) to the network, switching from idle-state to connected state in the case of an upcoming uplink (UL) or downlink (DL) data transfer, connection re-establishment and handover. In future 5G networks, random access procedures are also expected to be used for infrequent data transmission by Internet of Things (IoT) device and machine type communication (MTC) devices.

A typical random access protocol includes the UE selecting and sending a random preamble sequence to the eNodeB (eNB). The eNB sends random access responses (RAR) to the UEs that have sent preamble sequences and the RARs are assigned different time-frequency resources. Each UE that receives a RAR sends a radio resource control (RRC) connection request in order to obtain resources for subsequent DL/UL data transmission. Where multiple UEs transmit their RRC connection request on the same time-frequency resources, because they have used the same preamble sequence in the first step, their requests will not be decoded simultaneously by the eNB. A contention resolution mechanism starts at the UEs that have not received a contention resolution message from the eNB and the procedure restarts with the UE selecting a random preamble sequence.

One of the main limitations of this random access procedure is latency. Restarting the random access procedure does not guarantee that the RRC connection will be granted. Where there are many UEs, this legacy random access procedure can lead to increased average latencies in acquiring the RRC connection.

Another limitation of legacy random access procedures relates to standalone millimetre wave (mmW) access networks. In particular, mmW cellular networks are expected to be based on transmit (Tx) and receive (Rx) beamforming in order to alleviate the high path-losses in such frequencies. However, in order to design the transmit and receive beamformers the Tx-Rx channel or relative location needs to be known. In case of connection establishment, typically there is no such prior information.

Accordingly, it would be desirable to be able to provide a random access procedure for a wireless communication system that addresses at least some of the problems identified above.

SUMMARY

It is an object of the invention to provide an efficient random access procedure in a cellular communication system. This object is solved by the subject matter of the independent claims. Further advantageous modifications can be found in the dependent claims.

According to a first aspect of the invention the above and further objects and advantages are obtained by a network node for a wireless communication system. In one embodiment, the network node includes a processor and a transceiver. The processor is configured to generate a plurality of random access grant signals where the random access grant signals including: at least one unoccupied radio network temporary identifier; and a resource allocation for an uplink communication request. The processor is configured to assign the plurality of random access grant signals to one or more downlink transmit beams; and the transceiver is configured to periodically transmit the plurality of random access grant signals on the one or more downlink transmit beams using a same time-frequency resource. The aspects of the disclosed embodiments reduce the latency of random access procedures for large amounts of wireless devices. The number of steps in random access procedures are advantageously reduced.

In a first possible implementation form of the network node according to the first aspect as such the processor is configured to map different radio network temporary identifiers to different random access grant signals. The radio network temporary identifiers included in a random access grant signals are unique to avoid collisions with other users.

In a second possible implementation form of the network node according to the first aspect as such, or the first possible implementation form of the first aspect the processor is configured to employ one or more code-sequences to broadcast the plurality of random access grant signals. Each random access grant signal can be transmitted with a different code sequence on a different beam.

In a third possible implementation form of the network node according to the first aspect as such or according to any one of the preceding possible implementation forms, the processor is configured to randomize a beam angle offset applied to the one or more downlink transmit beams. Randomizing the beam angle offset can advantageously decrease the probability of interference and avoid two beams with identical code-sequences formed toward the same region of space.

In a fourth possible implementation form of the network node according to the first aspect as such or according to any of the previous possible implementation forms the processor is configured to code multiplex the plurality of random access grant signals, wherein codes mapped to different random access grant signals are orthogonal to each other. The downlink transmit beams are designed so that they are formed towards multiple directions in space with a one-to-one mapping between the code sequences and the transmit beam directions.

In a fifth possible implementation form of the network node according to the first aspect as such or according to fourth possible implementation form the processor is configured to map each code multiplexed random access grant signal to the one or more downlink transmit beams. The downlink transmit beams are designed so that they are formed towards multiple directions in space with a one-to-one mapping between the code sequences and the transmit beam directions.

In a sixth possible implementation form of the network node according to the first aspect as such or according to any one of the preceding possible implementation forms the processor is configured to include an uplink reference signal request in each random access grant signal. Such an uplink reference signal is useful for determining channel state information at the transmitter or user node location estimation.

In a seventh possible implementation form of the network node according to the first aspect as such or according to any one of the preceding possible implementation forms the processor is configured to include a paging message in each random access grant signal. By including a paging message into the random access grants, latency critical users in an idle mode can be connected without any additional paging delays.

In an eighth possible implementation form of the network node according the first aspect as such or according to any one of the preceding possible implementation forms the processor is configured to include a system information (SI) modification flag in each random access grant signal. By including a system information flag, paging procedures are not needed for informing latency critical users about system information modification.

In a ninth possible implementation form of the network node according to the first aspect as such or according to any one of the preceding possible implementation forms after receipt of the uplink communication request the network node is configured to identify the unoccupied radio network temporary identifier as occupied and include a new unoccupied radio network temporary identifier in a subsequent random access grant signal. The RNTI included in the RAG should be unique.

According to a second aspect of the invention the above and further objects and advantages are obtained by a user node for a wireless communication system. In one embodiment the user node includes a processor and a transceiver. In one embodiment the processor is configured to identify at least a radio network temporary identifier and a resource allocation in a signal received on a time-frequency resource. The transceiver is configured to transmit an uplink communication connection request using the resource allocation indicated in the received signal. The aspects of the disclosed embodiments reduce the latency of random access procedures for large amounts of wireless devices. The number of steps in random access procedures, such as the need to transmit a preamble sequence, are advantageously eliminated or reduced.

In a first implementation form of the user node according to the second aspect as such the processor is configured to correlate the received signal with a set of predetermined codes, select a code from the set of predetermined codes that yields a largest correlation with the received signal, use the selected code to decode the received signal and identify the one or more parameters for the uplink communication connection request. After successful decoding of the information symbols, user node can transmit the radio resource control connection request. The aspects of the disclosed embodiments reduce collision probability.

In a second implementation form of the user node according to the second aspect as such or according to the first implementation form of the second aspect the processor is configured to detect a request in the received signal for the user node to transmit an uplink beacon reference signal in addition to transmitting the uplink communication connection request. The uplink reference signal is useful for determining channel state information at the transmitter or user node location estimation.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
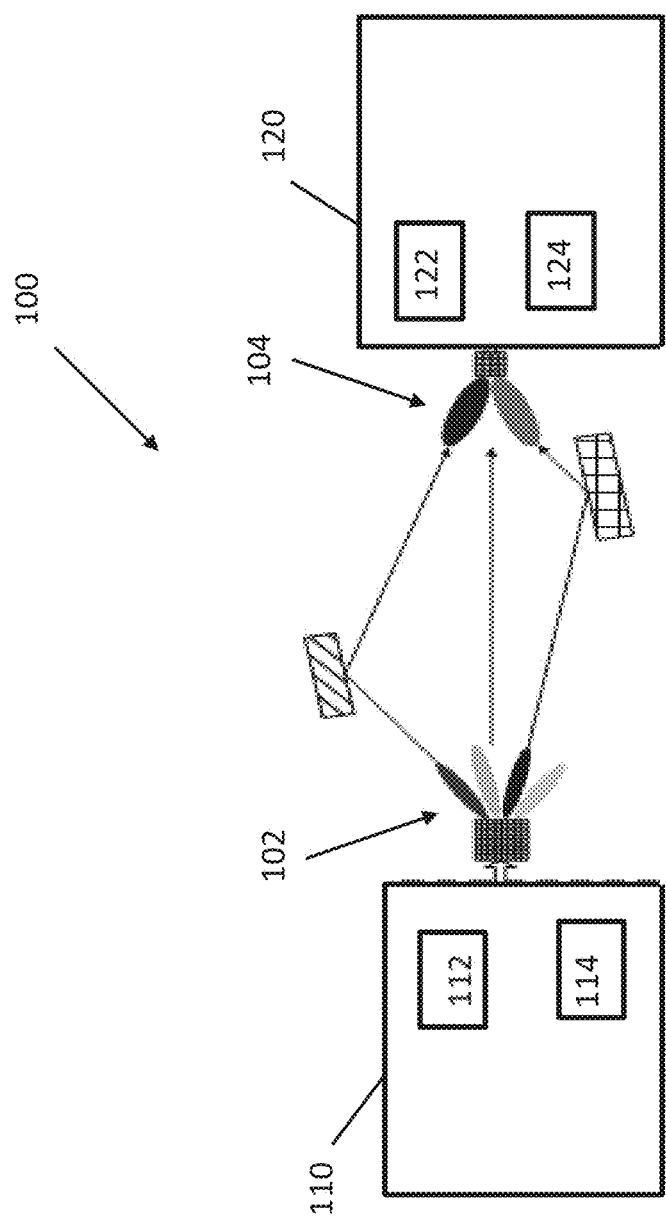
FIG. 1 is a block diagram illustrating an exemplary communication system incorporating aspects of the disclosed embodiments.

Referring to FIG. 1 there can be seen an exemplary block diagram of a communication system 100 incorporating aspects of the disclosed embodiments. The aspects of the disclosed embodiments are directed to a random access procedure that achieves low latency in acquiring radio resource control (RRC) connections for a large number of user equipment (UE).

As is illustrated in FIG. 1, the wireless communication system 100 includes at least one network node 110 and at least one user node 120. The wireless communication system 100 can be any suitable type of wireless communication system, such as for example, but not limited to LTE, 5G or new radio (NR). In one embodiment, the network node 110 can comprise or include a network node such as an Evolved Universal Terrestrial Radio Access Network (E-UTRAN)

NodeB or evolved NodeB (eNB). The user node 120 can comprise or include one or more user equipment (UE) or communication apparatus such as a mobile communication device, for example.

In the example of FIG. 1, the network node 110 is configured to include at least one processor or processing device 112 and at least one transceiver device 114. While the processor 112 and transceiver 114 are shown in FIG. 1 as being separate devices, in alternate embodiments, the processor 112 and transceiver device 114 can comprise a single device. The network node 110 can include any suitable number of processors 112 and transceivers 114, depending upon the particular application and implementation.

The network node 110 can also be configured to include one or more antennas or antenna arrays 102. The antennas or antenna arrays 102 will be generally configured to generate one or more beams, generally referred to herein as directional beams 104.

A user node 120 will generally be configured to include at least one transceiver 122 and at least one processor or processing device 124. Although the transceiver 122 and processor 124 are shown in the example of FIG. 1 as separate devices, in alternate embodiments, the transceiver 122 and processor 124 can comprise a single device or unit. The user node 120 can be configured to include any suitable number of transceivers 124 and processors 122, depending upon the particular application and implementation.

In one embodiment, the user node 120 can be configured to also include one or more antennas or antenna arrays 104. The antennas 104 are configured to generate one or more receiving beam patterns, to receive, among other things, the signals transmitted from the network node 110.

The aspects of the disclosed embodiments are directed to initiating a random access procedure by transmitting a plurality of random access grant signals from the network node 110. The network node 110 in the example of FIG. 1 is configured to broadcast unique resources for radio resource control connection requests. By exploiting the spatial domain, the probability of having two or more user nodes receiving the same random access grant signal is lower than in legacy systems. Unlike legacy systems of the prior art, the random access process of the disclosed embodiments does not require a transmission of a preamble sequence transmitted by the user node. Rather, the random access procedure of the disclosed embodiments is initiated by the random access grants that are transmitted, or broadcasted, by the transmission point or network node 120 in these examples.

Figure 2:
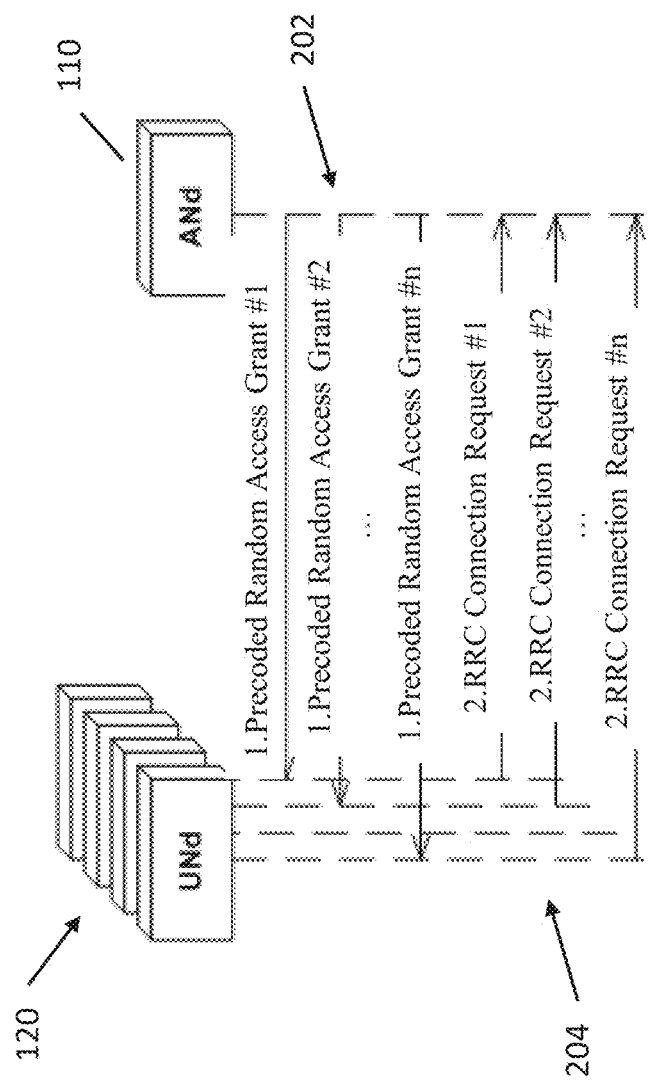
FIG. 2 illustrates a schematic diagram of an exemplary process flow in a system incorporating aspects of the disclosed embodiments.

Referring also to FIG. 2, one example of a process incorporating aspects of the disclosed embodiments is illustrated. In this example, the at least one network node 110 transmits or broadcasts 202 at least one random access grant signal, generally illustrated in FIG. 2 as Precoded Random Access Grant signal #1 to Precoded Random Access Grant signal # n. These downlink (DL) transmissions are referred to herein as Random Access Grants (RAGs).

As will be further described herein, these random access grants are configured to include at least one unoccupied radio temporary identifier and a resource allocation for an uplink communication (UL) request, such as a radio resource control connection request. The network node 110 is configured to transmit the unique temporary identifiers and time frequency allocations for the radio resource control connection requests.

In one embodiment, the processor 112 is configured to generate the plurality of random access grant signals and assign the plurality of random access grant signals to one or more downlink transmit beams 102. The transceiver 114 is configured to transmit or broadcast the plurality of random access grant signals on one or more downlink transmit beams 102, as will be generally described herein.

In accordance with the aspects of the disclosed embodiments, the plurality of random access grant signals can be transmitted using a same time-frequency resource. Additionally, in one embodiment, the transceiver 114 can be configured to transmit the plurality of random access grant signals in a periodic manner. For example, the network node 110 can be configured to send the random access grant signals on a time basis, such as once every 5 milliseconds. In alternate embodiments, any suitable time interval can be used to send the random access grant signals in a periodic manner.

Referring again to FIGS. 1 and 2, the user node 120 is generally configured to receive a random access grant signal and generate 204 a radio resource control connection request. In the example of FIG. 2, the plurality of user nodes 120 are configured to transmit 204 a plurality of radio resource control connection requests, generally shown as Radio Resource Control Connection Request #1 to Radio Resource Control Connection Request # n. For example, in one embodiment, the processor 122 of user node 120 is configured to identify at least a radio network temporary identifier and a resource allocation in a signal received on a time-frequency resource. The transceiver 124 of the user node 120 can be configured to transmit an uplink communication connection request, such as a radio resource control connection request, using the resource allocation indicated in the received signal.

In one embodiment, the user node 120 receives the random access grant from the network node 110 and correlates the random access grant with a set of predetermined codes, such as a code book. The user node 120 is configured to select a code from the set of predetermined codes that yields the largest correlation with the received signal. The selected code is configured to be used to despread and decode the code-multiplexed information and identify one or more parameters for the uplink communication request. These parameters can include the temp C-RNTI and time-frequency allocation for the radio resource control connection request. After a successful decoding of the random access grant, the user node 120 transmits 204 a radio resource control connection request on the time-frequency resources indicated in then random access grant signal.

The subsequent steps in the random access procedure are generally the same as in the random access procedures in legacy communication systems. This can include the transmission from the network node 110 of the cell radio network temporary identity (C-RNTI) and the radio resource control connection request parameters.

In a situation where two or more user nodes 120 decode the same random access grant signal, an uplink collision will occur and some of the radio resource control connection requests may not be decoded. In this case, the user nodes 120 that have failed to establish a radio resource control connection will discard the received random access grant signal and temporary C-RNTI. The random access procedure of FIG. 2 restarts during the next random access window.

The radio network temporary identifier included in a random access grant should be unique, at least within a cell or some centrally controlled geographical area. The network node 110 is configured to send out random access grants with unoccupied radio network temporary identifiers. By broadcasting unique resources for the radio resource control connection requests, the probability of having two or more user nodes 120 receiving the same random access grant is lower than in legacy systems.

The aspects of the disclosed embodiments allow the network node 110 to transmit unique temporary identities and time-frequency allocations for radio resource control connection requests. The preamble sequence that would be transmitted by user equipment in a legacy communication system does not take place in accordance with the aspects of the disclosed embodiments. Rather, the random access procedure is initiated by the random access grants that are transmitted or broadcasted by the network node 110, generally in a periodic manner.

In one embodiment, the random access grants are code-multiplexed, assigned to different DL transmit beams 102, and transmitted simultaneously. The DL transmit beams 102 are configured in a way that they are formed towards multiple directions in space. Moreover, in accordance with the aspects of the disclosed embodiments, there is generally a one-to-one mapping between a code sequence and transmit beam direction. For example, in case of n random access grants, there are n code-sequences and n beams. As will be described further herein, each random access grant is transmitted with a different code-sequence on a different beam.

Figure 3:
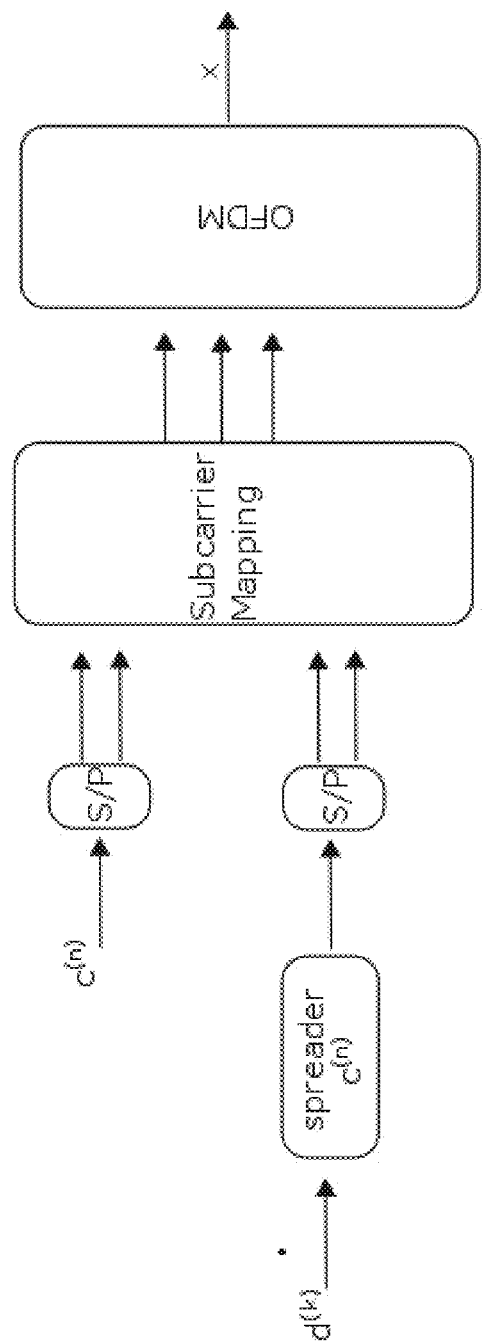
FIG. 3 illustrates a schematic diagram of illustrating the formation of a random access grant signal in a system incorporating aspects of the disclosed embodiments.
Figure 4:
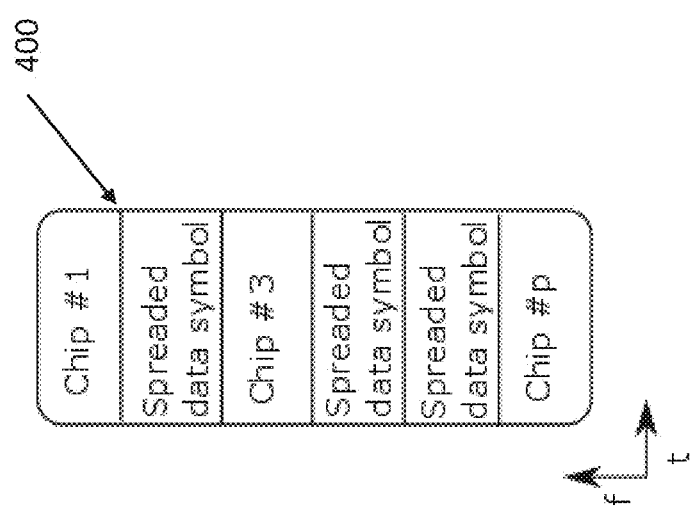
FIG. 4 illustrates a schematic block diagram of an exemplary random access grant signal in a system incorporating aspects of the disclosed embodiments.

FIGS. 3 and 4 illustrate the exemplary formation of a random access grant signal incorporating aspects of the disclosed embodiments. The code-sequence symbols, or chips, are used for channel estimation at the user equipment 120. The obtained channel gain can be used for equalizing the information symbols. Symbol detection is then performed.

For example, referring to FIG. 3, in one embodiment, a code sequence $c^{(n)}$ is mapped to subcarriers in serial to parallel manner. This will be used for channel estimation at the user node 120. The information symbols $d^{(k)}$ describe an indication of the unique temporary identities and time-frequency allocations for the radio resource control connection requests. As is illustrated in FIG. 3, the information symbols $d^{(k)}$ are spread with the code sequence $c^{(n)}$ and then mapped to subcarriers in a serial-to-parallel manner. A time-domain OFDM signal (x) is then formed.

FIG. 4 illustrates an exemplary random access grant signal 400. The random access grant signal 400 illustrates the exemplary sub-carrier assignment of the information symbols $d^{(k)}$ and code sequence symbols $c^{(n)}$ from FIG. 3.

Figure 5:
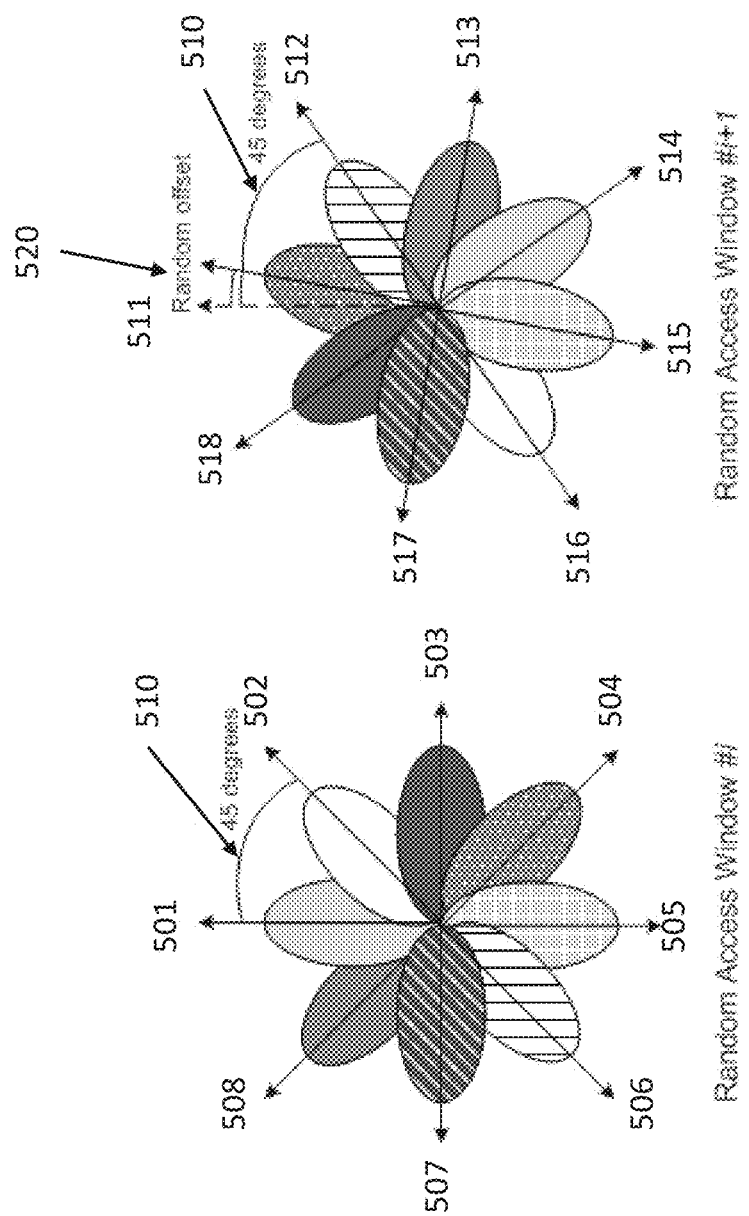
FIG. 5A and FIG. 5B are a illustrates schematic diagrams of exemplary random access grant signal transmissions in a system incorporating aspects of the disclosed embodiments.

The code-sequences $c^{(n)}$ used to broadcast the precoded RAGs may be reused by neighboring network nodes 110. However, in order to decrease the probability of interference and avoid having two beams with identical code-sequences $c^{(n)}$ formed toward the same region of space, the network nodes 110 may randomize the code-sequence usage as well as randomize a beam angle offset. This is illustrated in the example of FIGS. 5A and 5B. The term "randomize" or "randomization" as applied to the beam offset is generally intended to mean that the transmit beams are shifted/rotated randomly.

FIGS. 5A and 5B each represent different random access windows. In the example of FIGS. 5A and 5B, random access grants are code-multiplexed and broadcast on different beams 501-508 and 511-518 in each random access window. Each of the eight beams 501-508 and 511-518 is carrying unique random access grant information coded with predetermined sequences. The numbering in FIGS. 5A and 5B is merely illustrative, and does not imply any particular ordering.

As noted above, when there are n random access grants, there are n code-sequences and n beams. In the example of FIGS. 5A and 5B, there is one code-sequence per beam, resulting in eight orthogonal sequences used on each of the eight beams 501-508 and 511-518.

The exemplary beams 501-508 and 511-518 in the examples of FIGS. 5A and 5B are formed with equal spacing of azimuth angles 510. As an example, the azimuth spacing 510 between beam 501 and 502 in FIG. 5A is approximately 45 degrees. In alternate embodiments, any suitable azimuth spacing can be implemented.

In one embodiment, referring to FIGS. 5A and 5B, substantially equal azimuth spacing 510 is maintained between the different in the random access window # i of FIG. 5A and # i+1 of FIG. 5B. However, as is illustrated in FIG. 5B, a random offset 520 is used for steering beams 511-518 to different directions. In one embodiment, non-equal beam directions can be used for example when potential user nodes 120 are not distributed around the network node 11 is a substantial uniform manner.

In one embodiment, a common RNTI address space can be maintained across the network 100. For example, a central controller entity (not shown) can be used for assigning unoccupied RNTIs to the network node 110, which will in turn broadcast the unoccupied RNTIs in the RAGs during the random access windows, as is generally described herein. When a radio resource control connection is established, information about occupied RNTIs can be updated from the network node 110 to the central controller entity. Hence, in addition to centrally controlled ultra-dense networks, one use case of such RNTI control is a heterogeneous network where larger macro cells can assign RNTIs to be used by small cells.

Figure 6:
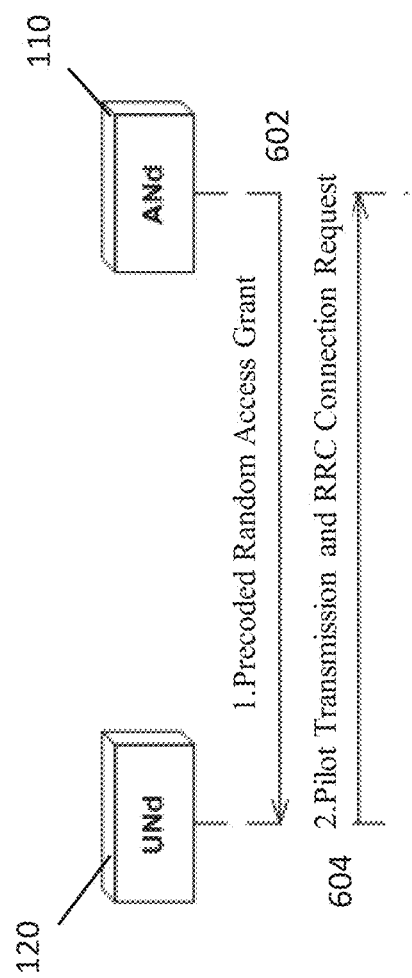
FIG. 6 illustrates a process flow illustrating the transmission of an uplink reference signal in a system incorporating aspects of the disclosed embodiments.
Figure 7:
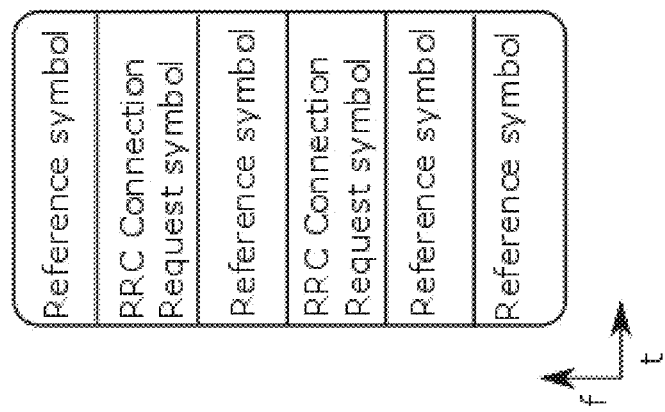
FIG. 7 illustrates a block diagram of an exemplary radio resource control connection request in a system incorporating aspects of the disclosed embodiments.

Referring to FIG. 6, in one embodiment, a random access procedure starts with the transmission 602 of precoded RAGs that include information requesting the at least one user node 120 to transmit 604 an uplink reference signal/beacon in addition to the radio resource control connection request. An exemplary subcarrier allocation of a radio resource control connection request and reference symbol/beacon is illustrated in FIG. 7. Such an uplink reference signal is useful for channel state information at transmitter (CSIT) or user node location estimation. In this manner, the network node 110 can subsequently transmit downlink control information in a precoded manner.

Figure 8:
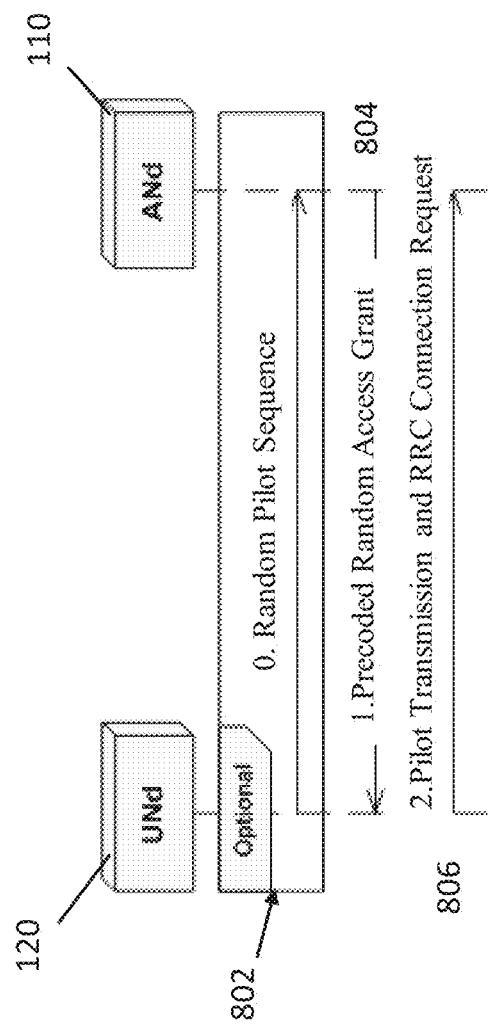
FIG. 8 illustrates a schematic diagram of an exemplary random access process in a system incorporating aspects of the disclosed embodiments.

Referring to FIG. 8, in one embodiment, a random access procedure starts with an uplink reference signal transmission 802 from the user node 120. The uplink reference signal transmission 802 can include the transmission of a pilot sequence. Such a procedure is useful in large-cells, to for example, adjust the transmission power and/or uplink timing advance. For example, by measuring such a pilot sequence or signal, the network node 110 can configure and transmit 804 a precoded random access grant for a desired user node 120. In one embodiment, this precoded random access grant can include for example, a timing advance value, which can be used to compensate for the delay caused by a distance between the user node 110 and the access node 120. The uplink signal transmission 806 from the user node 120 can include a pilot transmission in addition to the radio resource control connection request. The choice of starting the random access procedure with the transmission 802 of an uplink reference signal as shown in FIG. 8 is done by the network node 110, and broadcasted periodically in system information blocks, right after the user nodes 120 have acquired synchronization to the network node 110.

The aspects of the disclosed embodiments also find application in standalone mmW access networks. In particular, broadcasting precoded and code-multiplexed random access grants provides signal-to-interference noise ratio (SINR)

gain, thus alleviating the high path-loss in mmW frequencies. This allows the user nodes 120 to design receive beamforming vectors by measuring the resulting SINR with a codebook of receive filters. Such an approach allows the mmW user node to attach to the network and keep track of the channel variations.

In one embodiment, paging related information can be included in the random access grants. By including also optional paging information (e.g. user identifier of paged user International Mobile Subscriber Identity (IMSI) as in current systems) into the random access grants, then latency critical users in idle mode can be connected without any additional paging delays. Furthermore, in one embodiment, a system information (SI) modification flag can be also included. Then additional paging procedures are not needed for informing latency critical users about system information modification.

The aspects of the disclosed embodiments provide for connecting a large number of users substantially simultaneously, and the latency of the random access procedure can be minimized especially in ultra-dense networks with MU-MIMO capable antenna arrays. The performance of the random access protocol according to the disclosed embodiments was assessed with a dynamic system level 5G simulator. The simulator was modeling a ultra-dense network, which generally consist of access nodes (or base stations) with 20 dual-polarized antennas each. A matched filter (MF) was used for calculating antenna weight vectors for beamforming.

Figure 9:
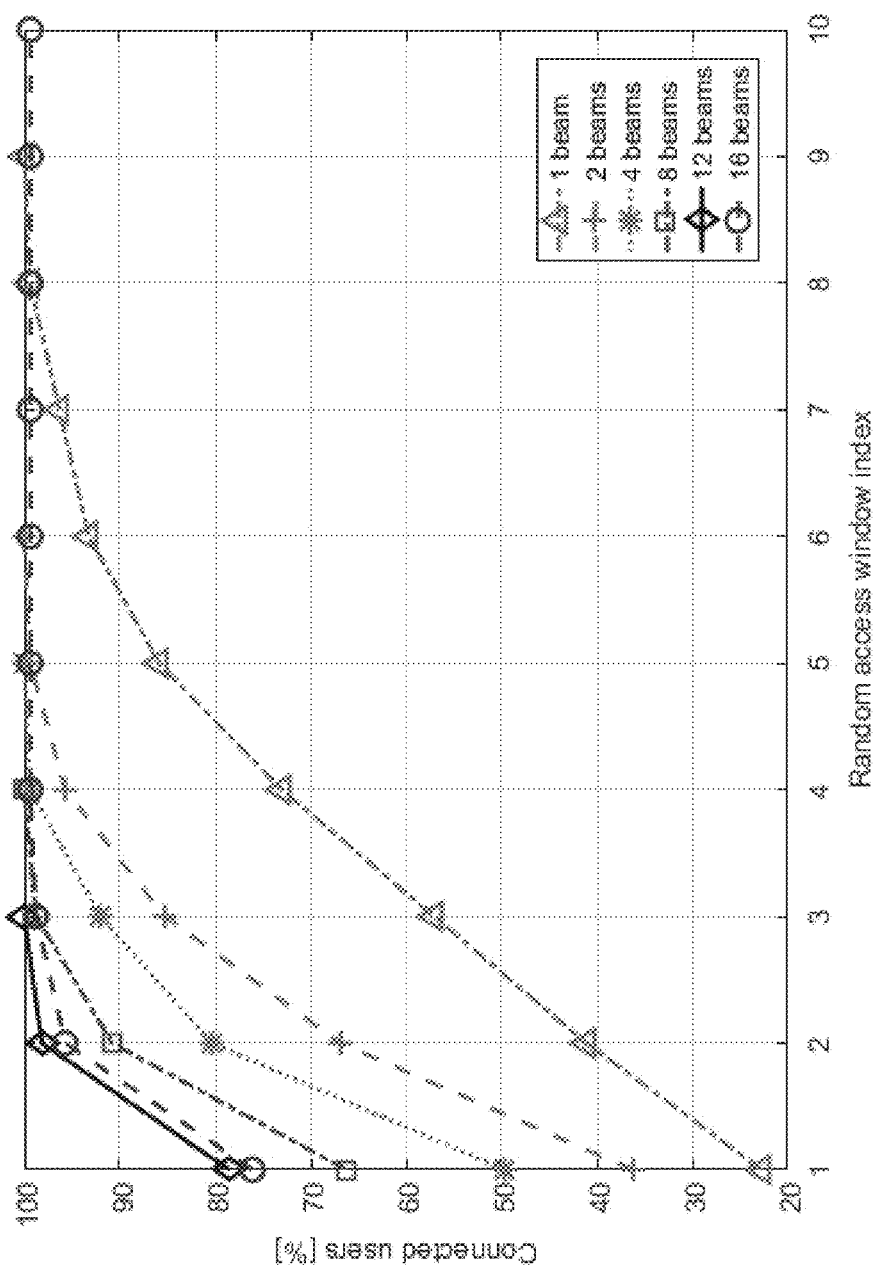
FIGS. 9 and 10 are graph illustrating result of simulation testing of a system incorporating aspects of the disclosed embodiments.

Two test cases were performed. The first test case tested how quickly 1000 users/km² starting random access procedure simultaneously can be connected without new users appearing. The results of first test case are shown in FIG. 9. With used simulation assumptions, twelve beams and orthogonal code-sequences was optimum. The results show that approximately 79% of users are successfully connected during the first random access window and all users are connected after the third random access window. It can be also seen that the algorithm works well with less beams and orthogonal code-sequences.

Figure 10:
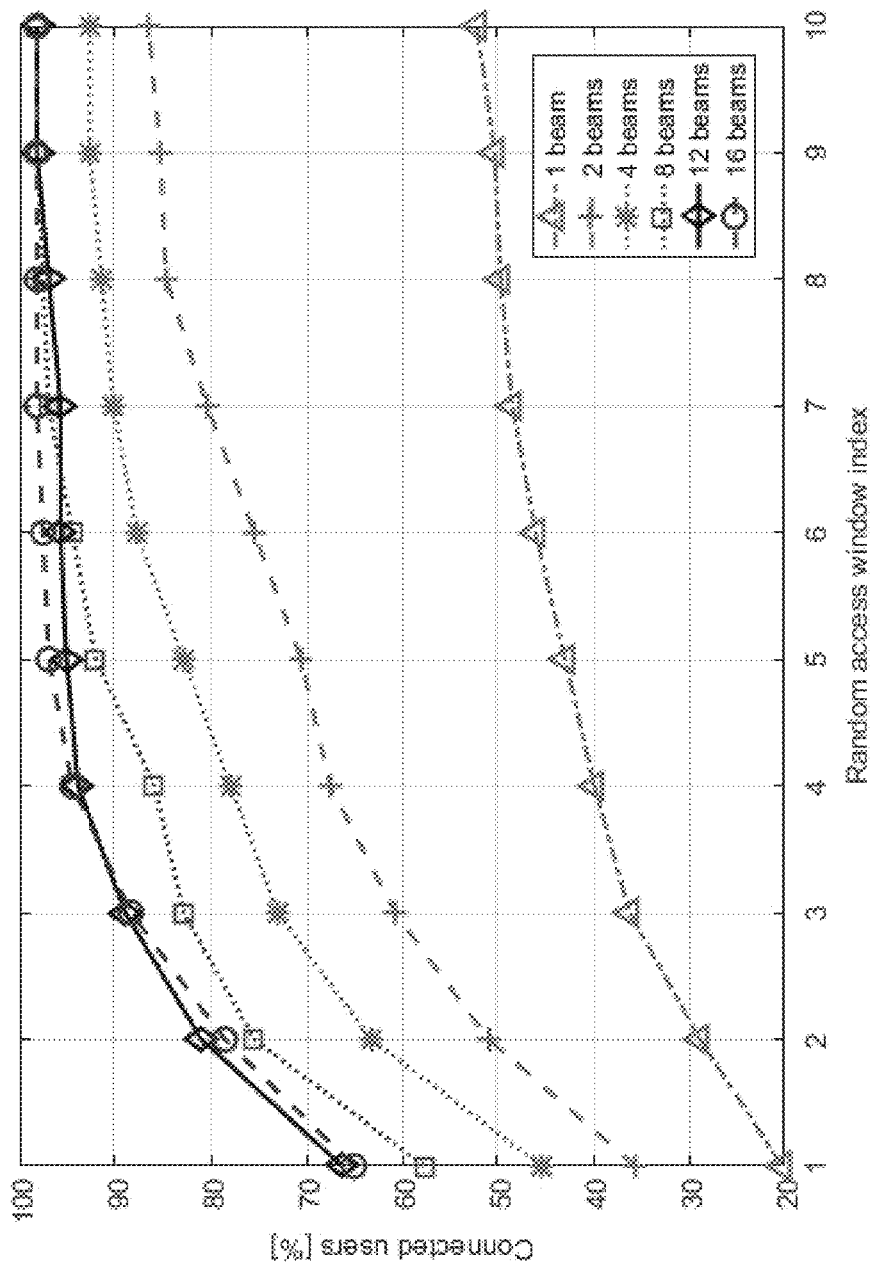

The results of a second test case are shown in FIG. 10. In this second test case, once users were able connect, new users were appearing in a way that there was always 1000 users/km² seeking an RRC connection. Back-off timers were not utilized, meaning that all connecting users were trying to utilize all random access window occasions. In this test case the optimal amount of beams and orthogonal sequences was also twelve. Even though large amounts of users are trying to connect all the time, approximately 95% of users can establish connection by utilizing less than five random access windows.

The results in FIGS. 9 and 10 are taken from different simulation realizations. Therefore, results differ slightly in first random access window occasion due to small number of realizations. After the first step, the number of users trying to connect is decreasing in the first test case, while in the second test case the amount of users trying to connect stays constant.

Test cases were also carried out without using without separate orthogonal code-sequences in each beam. In these test cases, Zero Forcing (ZF) was used instead of MF to create antenna weight vectors for beamforming. As shown by the results in FIGS. 9 and 10, the aspects of the disclosed embodiments can be implemented without separating beams in the code-domain by using a precoder (e.g. ZF) which makes beams non-overlapping in the spatial domain. This method requires less time and frequency resources, but is not as efficient as using MF and code-sequences. This is mostly because now there is also more inter-ANd interference generated since all beams are interfering each other. Furthermore, when user is between beams it cannot get high enough SINR because beams are not overlapping.

The amount of simultaneously connecting users in these test cases was extremely high. To optimize the proposed method in spectral efficiency, beams can be directed to directions were users usually are connecting, and not every beam has to be orthogonal to each other. For example, it might be optimal that the beams are directed in completely different directions, utilizing the same code-sequence. In other words something between MF plus all beams having different code-sequence and ZF without code-domain separation.

Figure 11:
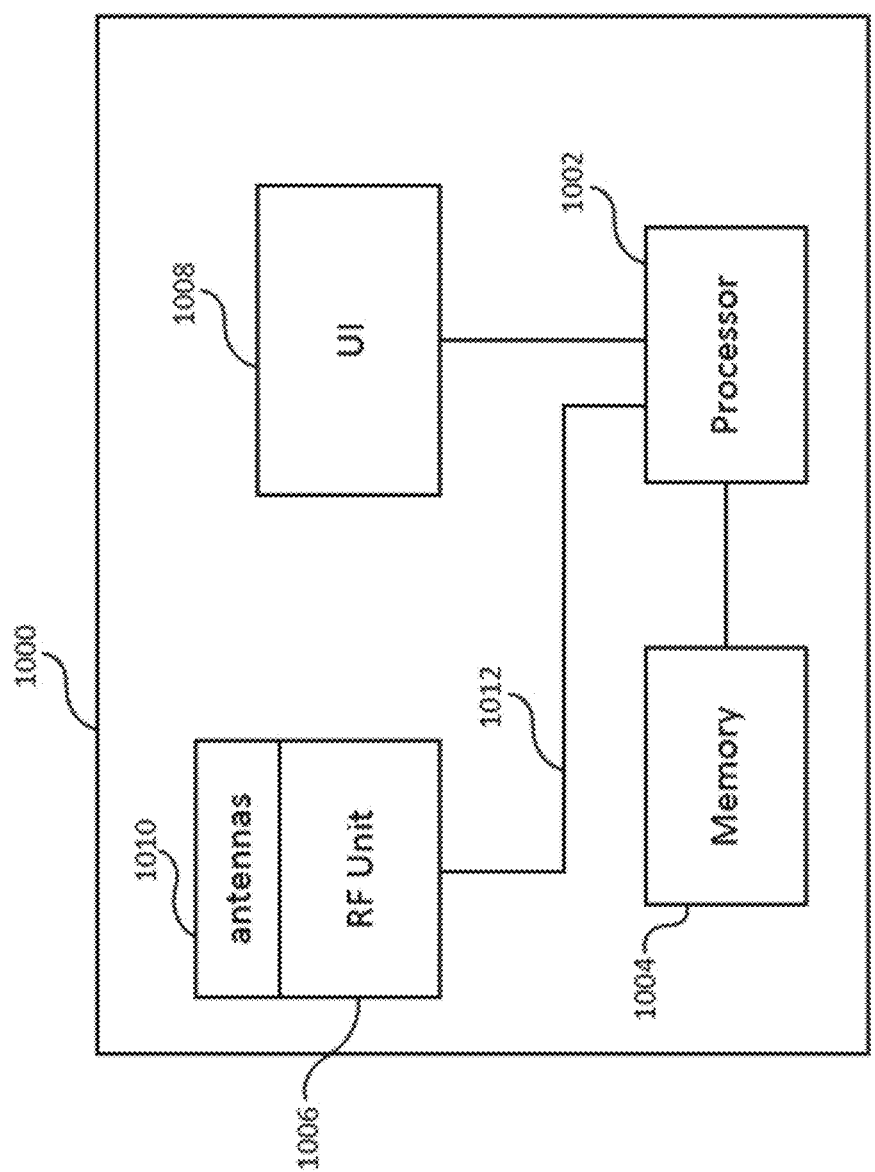
FIG. 11 is a block diagram of an exemplary computing architecture that can be used to implement aspects of the disclosed embodiments.

FIG. 11 illustrates a block diagram of an exemplary apparatus 1000 appropriate for implementing aspects of the disclosed embodiments. The apparatus 1000 is appropriate for use in a wireless network and can be implemented in one or more of the network node 110 or the user node 120. The network node 110 can comprise or include an Evolved Universal Terrestrial Radio Access Network (E-UTRAN) NodeB or evolved NodeB (eNB). The communication apparatus 120 can comprise or include various types of mobile computing devices, including various types of wireless communications user equipment such as cell phones, smart phones, tablet devices, and wirelessly connected automobiles. Alternatively the apparatus 1000 may be configured in or as an access node or base station in a wireless communication network.

The apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the apparatus 1000. When the UI 1008 is removed the apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112 and 124 described with respect to FIG. 1, may be configured to implement any of the methods described herein.

In the example of FIG. 11, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The apparatus 1000 can also include or be coupled to an RF Unit 1006 such as a transceiver, coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming. The antenna unit 1010 of FIG. 11 can be implemented as one or more of the antenna unit 102 or the antenna unit 104 shown in FIG. 1.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

The aspects of the disclosed embodiments are directed to the broadcasting of code-multiplexed and precoded random access grants. The random access grants are generally transmitted periodically and can include at least one unoccupied temporary radio network identifier, a time-frequency allocation for UL RRC connection request from UNds, Single or semi-persistent UL pilot allocation. An identifier of the codebook used by the network node to code-multiplex random access grants can be broadcast to the user node. In one embodiment, an identifier signaling the user node to start the random access procedure can be broadcast by transmitting an uplink UL preamble, or by receiving a random access grant. The precoded random access grant can include single or semi-persistent pilot allocation. The user node can select the best random access grant transmitted during random access window, and the base station or network controlling entity can vary the beam angles and sequence order of the beams. In one embodiment, a central controller entity grants unoccupied RNTIs or subsets of RNTI address space for access nodes broadcasting RAGs. Paging messages can be included in the RAG to make paging and/or SI modification delays disappear for latency critical users.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A network node for a wireless communication system, comprising:
a processor configured to:
generate a plurality of random access grant signals, the random access grant signals including:
at least one unoccupied radio network temporary identifier; and
a resource allocation for an uplink communication request; and
assign two or more random access grant signals of the plurality of random access grant signals to each of one or more downlink transmit beams; and
a transceiver configured to periodically transmit the two or more random access grant signals of the plurality of random access grant signals on each of the one or more downlink transmit beams using a same time-frequency resource.

2. The network node according to claim 1 wherein the processor is configured to map different radio network temporary identifiers to different random access grant signals.

3. The network node according to claim 2, wherein the processor is configured to employ one or more code-sequences to broadcast the plurality of random access grant signals.

4. The network node according to claim 2, wherein the processor is configured to randomize a beam angle offset applied to the one or more downlink transmit beams.

5. The network node according to claim 2, wherein the processor is configured to code multiplex the plurality of random access grant signals, wherein codes mapped to different random access grant signals are orthogonal to each other.

6. The network node according to claim 1, wherein the processor is configured to employ one or more code-sequences to broadcast the plurality of random access grant signals.

7. The network node according to claim 6, wherein the processor is configured to randomize a beam angle offset applied to the one or more downlink transmit beams.

8. The network node according to claim 6, wherein the processor is configured to code multiplex the plurality of random access grant signals, wherein codes mapped to different random access grant signals are orthogonal to each other.

9. The network node according to claim 1, wherein the processor is configured to randomize a beam angle offset applied to the one or more downlink transmit beams.

10. The network node according to claim 9, wherein the processor is configured to code multiplex the plurality of random access grant signals, wherein codes mapped to different random access grant signals are orthogonal to each other.

11. The network node according to claim 1, wherein the processor is configured to code multiplex the plurality of random access grant signals, wherein codes mapped to different random access grant signals are orthogonal to each other.

12. The network node according to claim 11, wherein the processor is configured to map each code multiplexed random access grant signal to the one or more downlink transmit beams.

13. The network node according to claim 1, wherein the processor is configured to include an uplink reference signal request in each random access grant signal.

14. The network node according to claim 1, wherein the processor is configured to include a paging message in each random access grant signal.

15. The network node according to claim 1, wherein the processor is configured to include a system information (SI) modification flag in each random access grant signal.

16. The network node according to claim 1, wherein after receipt of the uplink communication request the network node is configured to identify the unoccupied radio network temporary identifier as occupied and include a new unoccupied radio network temporary identifier in a subsequent random access grant signal.

17. A user node for a wireless communication system, the user node comprising:
a processor configured to identify at least a radio network temporary identifier and a resource allocation from a plurality of random access grant signals received on a time-frequency resource, wherein the plurality of random access grant signals are received on a single beam; and
a transceiver configured to transmit an uplink communication connection request using the resource allocation identified from the received plurality of random access grant signals.

18. The user node according to claim 17, wherein the processor is configured to:
correlate the received signal with a set of predetermined codes;
select a code from the set of predetermined codes that yields a largest correlation with the received signal; and
use the selected code to decode the received signal and identify one or more parameters for the uplink communication connection request.

19. The user node according to claim 18, wherein the processor is configured to detect a request in the received signal for the user node to transmit an uplink beacon reference signal in addition to transmitting the uplink communication connection request.

20. The user node according to claim 17, wherein the processor is configured to detect a request in the received signal for the user node to transmit an uplink beacon reference signal in addition to transmitting the uplink communication connection request.

* * * * *